May 10, 1927.

S. ELLIS 1,627,890

IRRIGATED FLOWER BOX

Filed Feb. 19, 1926

Inventor
Stuart Ellis

By Lester L. Sargent

Attorney

Patented May 10, 1927.

1,627,890

UNITED STATES PATENT OFFICE.

STUART ELLIS, OF FREDERICKSBURG, VIRGINIA.

IRRIGATED FLOWER BOX.

Application filed February 19, 1926. Serial No. 89,384.

The object of my invention is to provide a window flower box having improved means for watering the plants at the bottom of the box throughout its length and for evenly distributing the water to the plants; to provide a box of this kind that can be manufactured conveniently and at small cost; and to provide a box of this type which is artistic in appearance and which by reason of its shape, will prevent a series of boxes being nested together and thus damaging their appearance in shipping same; and to provide a box of rigid construction. I attain these and other objects of my invention by the device illustrated in the accompanying drawings, in which:

Like figures indicate like parts in each of the several views.

Figure 1:
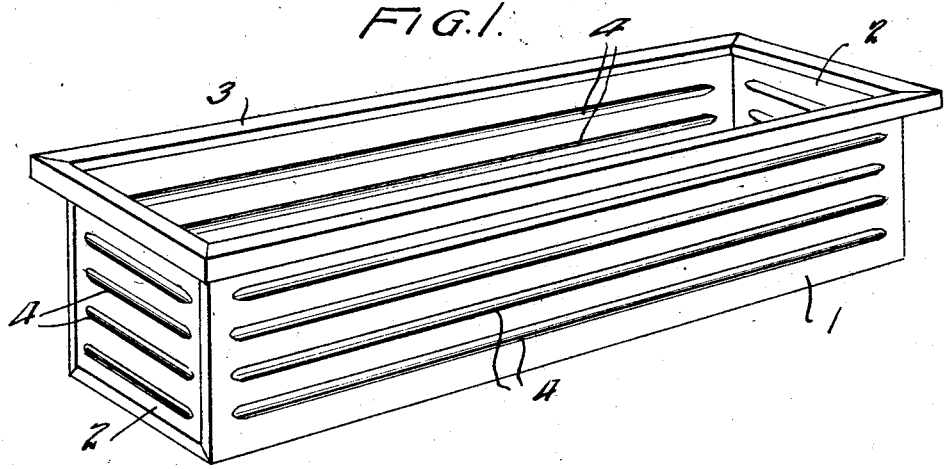
Figure 1 is a prospective view of my invention.
Figure 3:
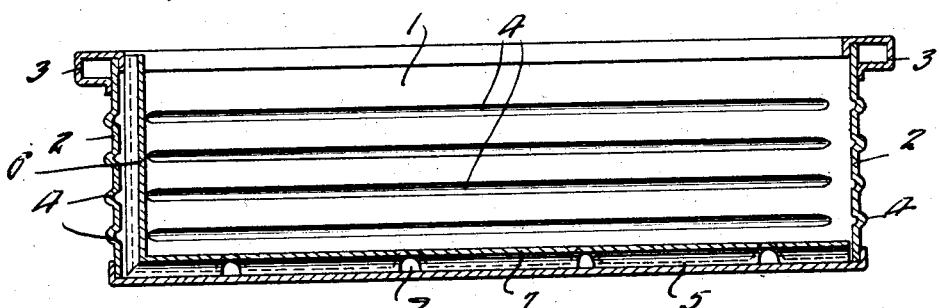
Fig. 3 is a longitudinal section through the box.

Referring to the accompanying drawings, I provide a rectangular preferably metal box 1, having spaced reinforcing corrugations 4 and having top rim 3 which projects over the top edge of the box and into the interior of the box a short distance, as shown in Figs. 1 and 3.

Figure 2:
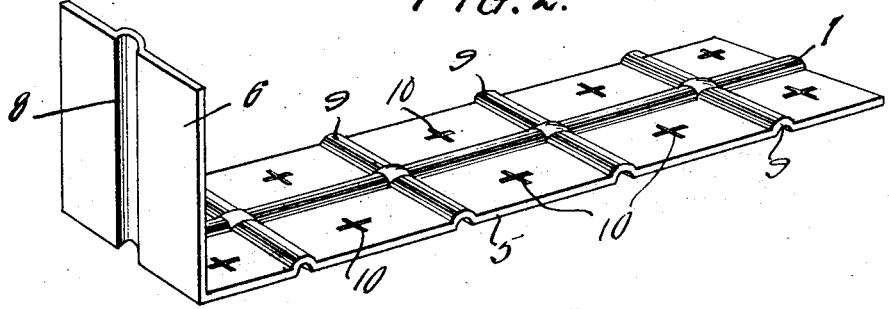
Fig. 2 is a prospective view of the plate seated in the box.

I provide an L-shaped plate, preferably of metal, and of suitable size to seat in the box 1, its horizontal portion 5 resting on the bottom thereof and its vertical portion 6 resting against one inside end of the box 1. I provide horizontal corrugation 7 extending longitudinally of portion 5 and a communicating vertical corrugation 8 in the upstanding portion of the L-shaped plate. I provide a series of spaced transverse raised corrugations 9 in the horizontal portion of the L-shaped plate, as shown in Figs. 2 and 3. I also provide a series of spaced slits 10, preferably in the form of a cross, perforating the bottom or horizontal portion 5 of the L-shaped plate 6, for the purpose of allowing water to seep through the plate.

Figure 4:
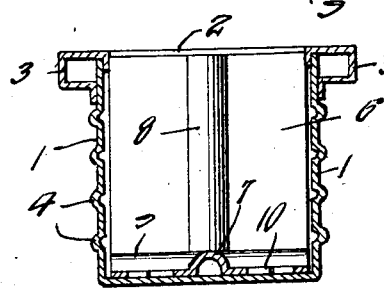
Fig. 4 is a transverse section through the box.

In use, the L-shaped plate is placed in the box 1 in the manner illustrated in Figs. 3 and 4. The corrugation 8 provides a channel through which water may be poured to the bottom of the box 5, where it may flow through the longitudinal corrugation 7 and thence to the transverse corrugations 9 to the edges of the horizontal portion 5 of the L-shaped plate. The water also seeps through the slits 10 and is thus evenly distributed to the earth and plant roots, thus providing means for long continuous irrigation of the box of plants.

What I claim is:

1. In a self-irrigating box, a plate L-shaped in vertical cross section seating on and extending over substantially the entire bottom of the box and having its upstanding end seating against one end of the box, a channel for the passage of water between the upstanding end of the L-shaped plate and the adjacent end of the box, the central bottom portion of the plate having a corrugation extending longitudinally thereof in communication with the first mentioned channel, and having spaced transverse corrugations for laterally distributing the water over the entire bottom portion of the box and the edges thereof.

2. In a self-irrigating box, a plate L-shaped in vertical cross section seating on and extending over substantially the entire bottom of the box and having its upstanding end seating against one end of the box, a channel for the passage of water between the upstanding end of the L-shaped plate and the adjacent end of the box, the central bottom portion of the plate having a corrugation extending longitudinally thereof in communication with the first mentioned channel, spaced transverse corrugations for laterally distributing the water over the entire bottom portion of the box and the edges thereof, the bottom portion of the plate also having a series of spaced slits disposed between the transverse corrugations to permit the water seeping upwardly over various portions of the bottom of the box.

STUART ELLIS.